Feb. 24, 1970     J. PARKINSON ET AL     3,497,070

FLUID FILTERS

Original Filed March 5, 1965     3 Sheets-Sheet 1

INVENTORS.
JOHN PARKINSON
ALFRED EIBICH
BY

ATTORNEYS

United States Patent Office 3,497,070
Patented Feb. 24, 1970

3,497,070
FLUID FILTERS
John Parkinson, Newark, and Alfred Eibich, Parsippany, N.J., assignors, by mesne assignments, to New Jersey Business Development Corporation, Newark, N.J., a corporation of New Jersey
Continuation of application Ser. No. 437,433, Mar. 5, 1965. This application Oct. 7, 1966, Ser. No. 585,722
Int. Cl. B01d 29/04, 25/02
U.S. Cl. 210—347                                1 Claim

ABSTRACT OF THE DISCLOSURE

A filter stack of sequential filter sheet pairs wherein alternate support elements are omitted and the alternate joining of successive pairs at their respective inner and outer peripheries forms gussets which are expandable making such filter stack flexible.

CROSS REFERENCE

The present application is a continuation of Ser. No. 437,433 filed Mar. 5, 1965, now abandoned.

This invention relates to fluid filters and more particularly, to an improved structure capable of filtering a wide variety of fluids of widely varying viscosities at a wide range of filtration efficiencies. Such efficiencies being possible in combination with widely varying degrees of temperature and pressure or both.

The filter demands of the aerospace industry in particular have required a maximization of dirt holding capacity for filters taking up a minimum of space, having a minimum weight with collapse resistance at least equal to or greater than the pressure of the fluid system, physical adaptability of a filter to the shapes demanded of the space to be utilized, ease of cleansability for reuse and resistance to thermal shock, among other things.

In the past, some of these problems have been partially solved by the use of fine wire mesh having its area increased by pleating. While pleated elements may have been able to provide filtering surface and some degree of strength, pleating oftentimes induced weaknesses into the filter mesh such as holes, and elements sufficiently structurally supported to withstand required collapse pressure tended to be bulky. Sintering and patching techniques also, while helpful in improving pleated elements, have not overcome the weaknesses induced into the mesh by its manifestation for pleating.

In the co-pending application of Kurt F. Hammer and John A. Charnock, Ser. No. 29,337, filed May 16, 1960, and issued as U.S. Patent No. 3,178,028, there is disclosed a filter adapted to overcome many of the problems of the prior art whereby a disc-shaped filter of fine wire mesh, generally of stainless steel, is provided wherein the filter cloth is welded or soldered to spacing rings at both the inner and outer peripheries of the cloth and the cloth elements protected by support elements between the layers of filter cloth. Such filter, while an advance over the prior art did not have the shape, flexibility nor dirt-holding capacity and weight saving required for many important uses.

In the aerospace field, every ounce of extra weight requires additional fuel to lift or pull. Every inch of space must be adequately utilized, every assurance must be had that the filter will not break down under use and poison the systems they are designed to protect. Cost is always a factor and reusability of expensive filters by cleaning adds utility to filters. Such filters must be adapted to temperatures from the cryogenic to great heat.

According to the present invention, a filter is provided adapted to filter particles of down to 15 to 20 microns or less and yet be able to withstand fluid pressure differentials from 3,000 to over 6,000 pounds per square inch, with temperatures from the cryogenic to intense heat, with an improved filter area, less weight, greater simplicity of manufacture, less fluid pressure drop in normal operation, higher dirt holding capacity, flexibility of shape where required and cleanable reusability.

The filter of the present invention may be made of very fine gauge metal mesh cloth pairs having inner and outer peripheries alternately metallically joined, soldered or welded, to spacer elements, sandwiching support elements between the filter sheets so that the pressure of operation, or unidirectional pulsation of fluid always has a support element between two filter sheets joined by a spacer element, providing extremely high differential pressure collapse resistance. The filter periphery adapted to receive the fluid inflow is spaced apart by the spacer and may be further held spaced apart by projecting on straps or bands were required.

The effective filter area is dependent upon the number of stacked pairs of mesh alternately joined at their inner and outer peripheries and the useable area of each sheet pair. The filter of the present invention has greater effective filter area for an equal filter volume than the prior pleated filters; in fact, width increases, the improvement in filter area of the present invention becomes more pronounced.

When the efficiencies of the present invention and pleated filters are the same, the volume of the present invention will be generally less and the size and weight of the present invention being generally smaller, there is at least a saving of the weight of the outer filter casing. With regard to the co-pending application of Hammer and Charnock, a filter of equal volume of the present invention will be lighter in weight, have increased dirt-holding capacity and lower pressure drop and be easier to clean.

The gussetted effect created by the alternate joining of inner and outer peripheries with support elements between the mesh which receives the fluid flow enables a concertina-like effect in opening the filter element for cleaning such as by solvents and ultrasonics with a support element engirdled by a spacer element between filter sheets or the support elements removably from the gussets of the filter stack for cleaning.

Such filter has a non-dependence over a retaining means such as a central tie rod or outer straps to maintain filter integrity, particularly as regards effective sealing between the filter sheet pairs. The filter stack may be bent in a semi-arcuate form with or without rigid retaining means, where desired.

For extreme collapse pressure resistance required by particular systems, end loading to hold the filter stack may be required and is possible with the present invention.

Although such novel feature or features believed to be characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Figure 1:
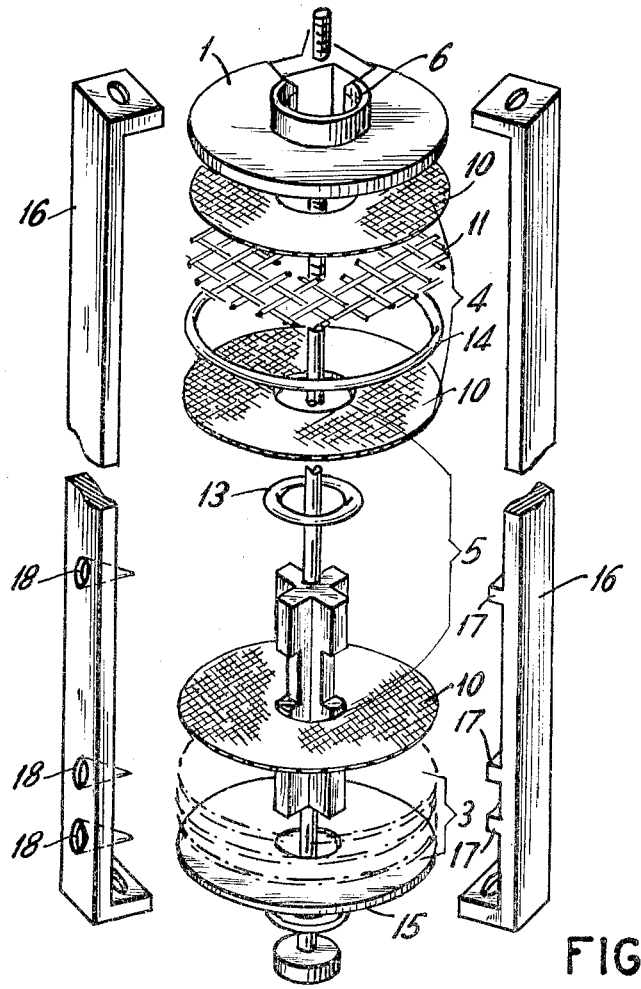
FIG. 1 is an exploded three-dimensional view of an illustrative embodiment of a filter constructed in accordance with the principles of the invention.
Figure 2:
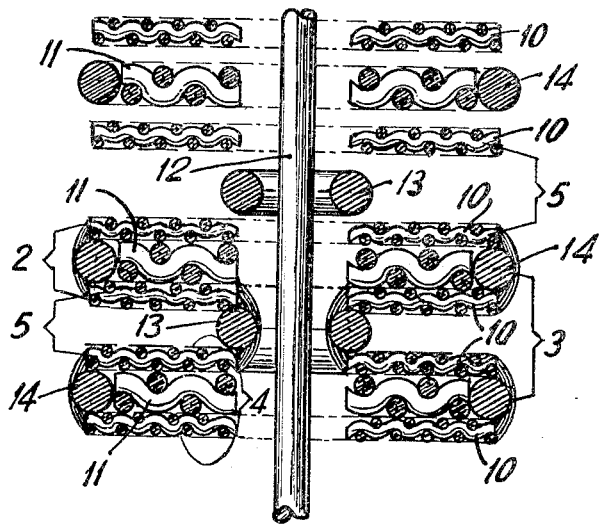
FIG. 2 is a sectional view of a portion of the inventive filter.

The filter 1 that is shown in FIGS. 1 and 2, comprises a plurality of fine mesh metal filter cloth sheets 10 in the form of flat circular discs. Fine woven stainless steel has proven advantageous, though other suitable metals may be employed. The finest of the mesh is preferably one which retains particles having dimensions of down to 15 or 20 microns or less. Interposed between adjacent first pairs of filter sheets 10 are support elements 11 which are also of flat circular disc configuration substantially of the same diameter as the filter sheets 10. Support elements 11 may consist of stainless steel wire mesh or other flow-permeable substance adapted to the particular filter use. Both the filter sheets 10 and the support elements 11 have central openings therethrough which are in registration, the center axial line of such openings preferably coinciding with the axis of the central tie bar 12 when such is employed. Although tie bar 12 is shown to be axially centrally disposed in the filter structure, in fact, it may not be needed at all, or if desired, may be disposed other than centrally since it does not function as an index for the elements but rather as a structure for enabling the convenient bringing together of the members comprising the filter.

When a tie bar is not centrally placed or when a plurality of them are used, it is adviseable to have them so located such that the end load maintains an even pressure on the stack 3 of the individual filter elements 4.

The filter sheets 10 comprising first pairs 2 of adjacent pairs of filter sheets 10 are spaced apart by spacing elements 14 which may suitably be stainless steel rings, whose cross-sectional configurations as illustrated, is circular, having a periphery substantially equal to that of the filter sheets 10 and support elements 11 in the construction of the filter. Other cross sections of the spacing elements 14, 13 such as square, have been found to be usable and effective. Filter sheets 10 of the first pairs 2 are metallically joined to each other and to be interposed spacing element 14 by suitable means such as by silver soldering welding, and the like. The support elements 11 consequently are interposed between the filter sheet 10 comprising the first pairs 2 and when the filter 1 is in operation in intimate contact with the opposing sides of the different sheets 10 of such first pair 2, the support element 11 is engirdled by its associate spacing element 14. Spacing elements 13 are provided for joining successive pairs 5 of filter sheets 10 at their inner peripheries, i.e., the circumferential edges of the openings therethrough, however, the spacing elements 13 effect the joint between a filter sheet of one first pair 2 and a filter sheet 10 of an immediately adjacent first pair 2 of filter sheets 10. Here again the inner periphery of the joined filter sheets 10 may be so joined by metallic welding or soldering and may be suitably welded to the spacing elements 13 as described in connection with spacing element 14.

Figure 6:
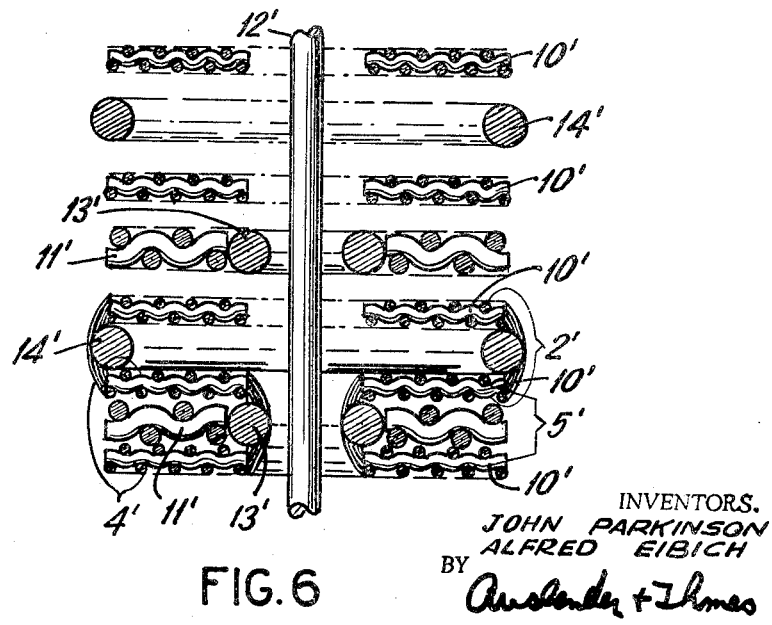
FIG. 6 is a partial section view of an embodiment of the present invention adapted to receive fluid to be filtered from its inner periphery.

In FIG. 6 the filter 1 comprises a plurality of filter sheets 10 which are in the form of flat circular discs. Interposed between adjacent second pairs 5' and pairs of filter sheets 10 are support elements 11' which are also of flat circular disc configuration, substantially of the same diameter as the filter sheets 10. Both the filter sheets 10 and the support elements 11' have central openings therethrough, the support element 11' surrounding the spacing element 13, the center axial line of such openings coinciding with the axis of the central tie bar 12. The filter sheets 10 comprising first pairs 2' of adjacent pairs of filter elements are spaced apart by spacing elements 14.

With the arrangements as described hereinabove, there results an accordion-like structure in which gussets are formed by the filter sheets 10 comprising pairs 2, 2' the inner junction in the accordion-like structure being provided by the joining of the inner peripheries of the filter sheets 10 comprising the second pairs 5, 5'. It is readily appreciated that the structure of the filter lends itself to ready cleaning by expanding it in concertina or accordion-like fashion. Such cleaning is usually by solvents, and may include use of ultrasonics.

The support elements 11' as shown in FIG. 6, may be split or segmented so that for the purpose of cleaning they are removable.

The presence of only a single spacing element 13, 13' adapts the filter 1 to all systems requirements except systems in which the fluid to be filtered has severe pressure surges back and forth in the fluid system.

Where unidirectional flow of unidirectional surging of fluid to be filtered is encountered, the filter of the present invention has a greater dirt-holding capacity, lighter weight and causes a lower pressure drop between the input and output of the fluid to be filtered and a collapse resistance against extremely high pressures.

The filter stack 3 comprising the individual filter elements 4 is held together between end plates 15 as shown in FIG. 1 which, as has been stated hereinabove, may be connected by central tie bar 12 passing through the centrally disposed holes in the filter element 1'. Tie bar 12 may suitably comprise a rod as shown, the form of a cross outline, or it may be a flat strip of metal which may be twisted along its axis to enhance its strength. Tie bar 12 suitably has threaded connections at its end to enable the tightening thereof of end plates 15 against the assemblage of the filter elements 4 to bring them into intimate contact when desired. The fluid to be filtered, such as oil, hydrocarbon fluids, hydraulic fluid, liquefied gasses and the like, can flow into the inter-element spaces between the filter sheets 10, i.e., those spaces not occupied by a support element 11, 11', through the filter sheets 10 and then through the filter elements 4, 4', through the support means 11, 11' which, because of its ease of permeability characteristics, allows fluid flow therethrough and provides comparatively little resistance to such flow and finally, into the central bore 6 of the filter 1 or out of the edges if input of fluid is through the center.

It has been found that where the diameters of the filter stack 3 is comparatively small, such as about six inches or less, it will generally be unnecessary to provide additional means to maintain the elements separated in a given space relationship. Such lack of necessity particularly will be apparent if the flow of fluid is inwardly of the outer periphery of the filter 1. However, in those cases wherein the filter sheets 10 are of larger diameters such as in excess of six inches, it may be desirable to provide an additional structure for holding the elements in space relationship, thus, in FIG. 1 is shown by way of example, additional structural spacing means, two or more straps 16 may be provided along the outer periphery of the filter stack 3, preferably, equally, angularly spaced therearound, each strap 16 such as shown in the strap 16 on the right of FIG. 1, may suitably have on its inner surface a plurality of extensions or fingers 17 which project radially inwardly into the inter-element spaces which do not contain support elements 11, i.e., no spaces between filter sheets 10 comprising second pairs 5, alternatively, straps 16 may have, instead of fingers 17 projecting from the inner surface thereof, pressed-out projections 18 as shown in strap 16 at the left of FIG. 1 which project radially inwardly into the inter-element spaces which do not contain support elements 11. The fingers 17 or projection 18 function to hold upon the adjacent filter elements 10 comprising a second pair 5 of sheet 10. Straps 16 and fingers 17 or projections 18 have been exaggerated in FIG. 1 to enable convenience of illustration. Actually, they are suitably chosen to be quite narrow so as to minimize any possible obstruction to fluid flow which may result therefrom, as is readily appreciated, strap 16 may also be employed to hold the filter assemblance together, thereby rendering the tie bar 12 unnecessary, when required.

Instead of straps 16, there may be utilized an external perforated corset or jacket for fitting wholly or partly around the outside of the filter assemblage to hold together and/or provide necessary spacing. Such corset or jacket may or may not have fingers or projections extending radially inwards for separating the filter elements as described above, depending on the requirements therefor.

It is, of course, to be realized that filter sheets 10 need not all be of the same material or of the same mesh size and that filter elements of different materials and/or a mesh size may be used in various combinations, for example, a relatively coarse mesh filter element may be used as a prefilter followed by a very fine mesh filter, or a fine stainless steel mesh element may be used, coated with a plastic such as polytetrafluoroethylene or with a layer of sintered metal powder.

Figure 3:
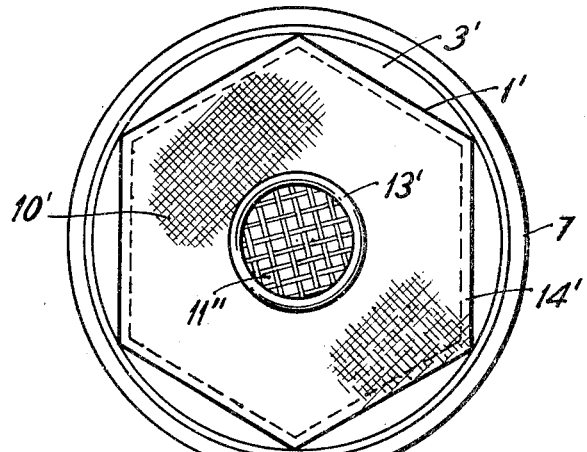
FIG. 3 is a plan view of an hexagonal filter according to the present invention in a filter case.

In FIG. 3 a further embodiment of the filter of the present invention is disclosed. The sheets 10' are in an optional form of an hexagonal metallically joined to spacer elements 14', 13' in a filter case 7. The filter 1' is not adapted to a central tie bar and has a support element 11'' without any opening completely filling the space engirdled by the outer peripheral spacing element 14'. The size and shape of the spacing element 13' is optional.

In the embodiment set forth in FIG. 3, location for the filter stack 3' in the filter case 7 may be provided by the points of contact of the hexagon, as shown. The configuration of FIG. 3 has the advantage of providing a support for the filter stack in the filter case 7 without some of the subsidiary supporting means used in the prior art.

Figure 4:
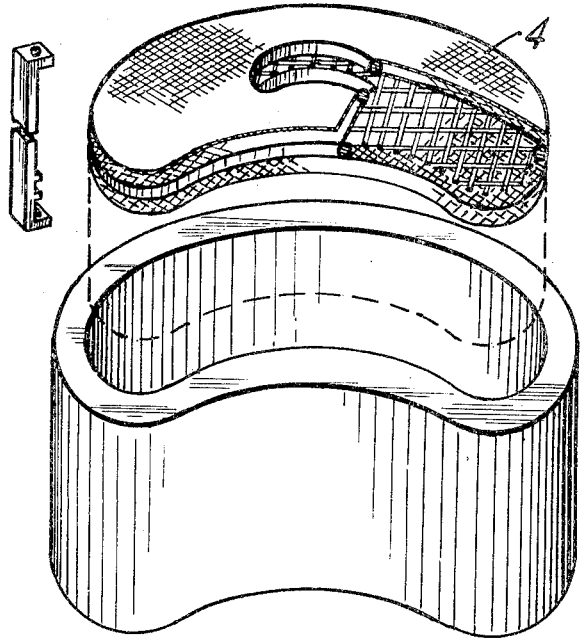
FIG. 4 is a view of another embodiment of the present invention exploded from the filter case.

The embodiment of the filter set forth in FIG. 4 is another optional shape kidney form as shown. Filters of the present invention may be adapted to the peculiar space needs required for jobs.

Adaption of the filter of the present invention to collapse pressure resistance up to over 6,000 pounds per square inch is a function of the structure filter stack and for the high resistance to collapse pressure includes the use of proper loading of the filter elements 4 with bands or stacks.

Figure 5:
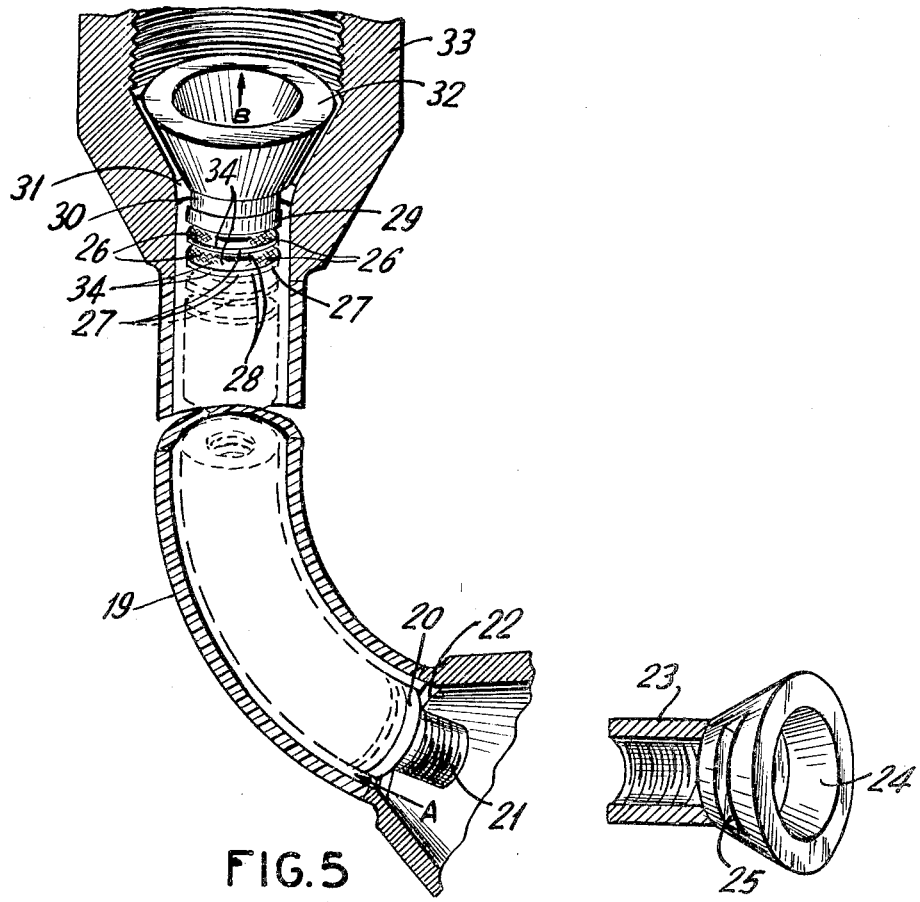
FIG. 5 is a partial section view of a filter of the present invention in a flexible tube.

In FIG. 5 a flexible filter of the present invention is set forth as adapted to filtering in a flexible tube. The filter fluid flows in direction, or arrow A as shown, enters the filter stack and exits through the inner opening in the filter sheets and passes out the flexible tube 19 in the direction or arrow B.

It is advisable to have an inner tie bar or support for filter stacks that are arcuate, for instance, to provide rigidity for stability. Where a flexible filter such as shown in FIG. 5 is employed, it is preferable to have its base anchored or some form or inner support in order for the filter to have its greatest collapse pressure resistance. This is effected by such anchoring, preventing longitudinal movement of the filter stack within the flexible tube.

The terms and expressions which are employed are used as terms of description, it is recognized, though, that various modifications are possible within the scope of the invention claimed.

What is claimed is:

1. A filter stack comprising the sequential alignment of filter sheet pairs, each of said filter sheet pairs consisting of a plurality of wire mesh filter sheets, said sheets each having an outer periphery and an inner disposed opening therethrough to define its inner periphery, a plurality of first metallic spacing elements for engirdling the outer peripheries of successive first pairs of filter sheets, a plurality of second metallic spacing elements defining the inner peripheries of successive pairs of filter sheets, said second pairs respectively comprising opposing filter sheets from different adjacent first pairs, a plurality of support elements interposed respectively between the filter sheets comprising said first pairs and engirdled by said spacing elements, said support members being relatively freely permeable for permitting free inflow of filter fluid between filter sheets comprising said first pairs, the outer peripheries of the filter sheets comprising said first pairs being respectively metallically joined to their engirdling first spacing elements to enclose said support elements therebetween, the inner peripheries of said filter sheets comprising said second pairs being respectively metallically joined to said second spacing elements, said filter being flexible, a flexible tube, said filter stack carried by said flexible tube and retaining means supporting said filter stack in said flexible tube.

References Cited

UNITED STATES PATENTS

| 3,178,028 | 4/1965 | Charmock et al. | 210—488 X |
|---|---|---|---|
| 3,209,915 | 10/1965 | Gutkowski | 210—487 X |

SAMIH N. ZAHARNA, Primary Examiner

U.S. Cl. X.R.

210—457, 487, 497